US012768957B2

(12) United States Patent
Luo

(10) Patent No.: US 12,768,957 B2
(45) Date of Patent: Oct. 20, 2026

(54) AC COUPLING CIRCUIT, LASER DETECTION MODULE, AND LIDAR

(71) Applicant: SUTENG INNOVATION TECHNOLOGY CO., LTD., Shenzhen (CN)

(72) Inventor: Jie Luo, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 476 days.

(21) Appl. No.: 18/542,765

(22) Filed: Dec. 17, 2023

(65) Prior Publication Data

US 2024/0210533 A1 Jun. 27, 2024

(30) Foreign Application Priority Data

Dec. 22, 2022 (CN) ........................ 202211651139.3

(51) Int. Cl.
*G01S 7/4861* (2020.01)
*G01S 7/481* (2006.01)

(52) U.S. Cl.
CPC .......... *G01S 7/4861* (2013.01); *G01S 7/4814* (2013.01); *G01S 7/4816* (2013.01)

(58) Field of Classification Search
CPC ...... G01S 7/4861; G01S 17/10; G01S 7/4814; G01S 7/4816
See application file for complete search history.

(56) References Cited

U.S. PATENT DOCUMENTS

| | | | | |
|---|---|---|---|---|
| 9,800,218 B1 * | 10/2017 | Rasmus | .............. | H03F 3/45197 |
| 2016/0013955 A1 * | 1/2016 | Dong | .................. | H04L 25/0292 375/317 |
| 2016/0173299 A1 * | 6/2016 | Islam | ...................... | H04L 25/06 375/232 |
| 2021/0211204 A1 * | 7/2021 | Nguyen | .............. | H04L 25/0278 |

FOREIGN PATENT DOCUMENTS

CN 211744472 U * 10/2020

* cited by examiner

*Primary Examiner* — Quan Tra
(74) *Attorney, Agent, or Firm* — BAYES PLLC

(57) ABSTRACT

Embodiments of this application disclose an AC coupling circuit, a laser detection module, and a LiDAR. The AC coupling circuit is configured to be accessed by a first AC signal and block a DC component in the first AC signal to output a second AC signal, and the AC coupling circuit includes an impedance matching circuit and a baseline drift reduction circuit. The impedance matching circuit has a signal input terminal configured to be accessed by the first AC signal, and the impedance matching circuit is configured to perform matching on transmission impedance of the AC coupling circuit. The baseline drift reduction circuit is connected with the impedance matching circuit. The baseline drift reduction circuit uses the symmetry of a baseline drift in the AC coupling circuit to reduce the baseline drift in the AC coupling circuit.

10 Claims, 6 Drawing Sheets

AC COUPLING CIRCUIT, LASER DETECTION MODULE, AND LIDAR

CROSS-REFERENCE TO RELATED APPLICATION

The present application claims the benefit of priority to Chinese Patent Application No. 202211651139.3, filed on Dec. 22, 2022, which is hereby incorporated by reference in its entirety.

TECHNICAL FIELD

This application relates to the technical field of LiDAR, and in particular, to an AC coupling circuit, a laser detection module, and a LiDAR.

TECHNICAL BACKGROUND

A LiDAR generates a corresponding echo signal after receiving a laser beam echo, and the echo signal is usually transmitted through an AC transmission line after being amplified by an amplifier. There is AC coupling capacitance in the AC transmission line, and echo signals corresponding to laser beam echoes have different distance information and echo signal strength, different echo signals cause a charge and discharge process on the AC coupling capacitance, which causes a drift of a baseline of a pulse signal, thereby eventually leading to a reduction in detection accuracy of the LiDAR.

SUMMARY

Embodiments of this application provide an AC coupling circuit, a laser detection module, and a LiDAR, which can improve ranging accuracy and reflectivity detection accuracy of the LiDAR.

According to a first aspect, an embodiment of this application provides an AC coupling circuit, where the AC coupling circuit is configured to be accessed by a first AC signal and block a DC component in the first AC signal to form and output a second AC signal, and the AC coupling circuit includes:

- an impedance matching circuit having a signal input terminal for being accessed by the first AC signal, where the impedance matching circuit is configured to perform matching on transmission impedance of the AC coupling circuit; and a baseline drift reduction circuit, connected with the impedance matching circuit and having a signal output terminal for outputting the second AC signal, where the baseline drift reduction circuit uses the symmetry of a baseline drift in the AC coupling circuit to reduce the baseline drift in the AC coupling circuit.

The impedance matching circuit includes a first resistance circuit and a second resistance circuit connected in series, a first terminal of the first resistance circuit is used as the signal input terminal, a second terminal of the first resistance circuit is connected with a first terminal of the second resistance circuit, a second terminal of the second resistance circuit is grounded, the first resistance circuit and the second resistance circuit are configured to perform matching on the transmission impedance of the AC coupling circuit, and the baseline drift reduction circuit is connected with a connection wire between the first resistance circuit and the second resistance circuit.

The baseline drift reduction circuit includes: a first DC blocking capacitor, where the second terminal of the first resistance circuit is connected with the first terminal of the second resistance circuit through the first DC blocking capacitor, and the first DC blocking capacitor is configured to block the DC component in the first AC signal to form the second AC signal.

The second terminal of the first resistance circuit and a first electrode plate of the first DC blocking capacitor are connected with a first reference node, the first terminal of the second resistance circuit and a second electrode plate of the first DC blocking capacitor are connected with a second reference node, and the baseline drift reduction circuit further includes:

- a first cancellation circuit, where a first terminal of the first cancellation circuit is connected with the first reference node, and a second terminal of the first cancellation circuit is connected with the signal output terminal; and a second cancellation circuit, where a first terminal of the second cancellation circuit is connected with the second reference node, and a second terminal of the second cancellation circuit is connected with the signal output terminal.

The first cancellation circuit includes a second DC blocking capacitor and a first voltage divider resistor connected in series, one of the second DC blocking capacitor and the first voltage divider resistor is connected with the first reference node, and the other is connected with the signal output terminal; and the second cancellation circuit includes a third DC blocking capacitor and a second voltage divider resistor (R4) connected in series, one of the third DC blocking capacitor and the second voltage divider resistor is connected with the second reference node, and the other is connected with the signal output terminal.

The baseline drift reduction circuit includes: a fourth DC blocking capacitor, where a second terminal of the first resistance circuit is connected with the first terminal of the second resistance circuit through the first DC blocking capacitor and the fourth DC blocking capacitor in sequence, a third reference node is provided between the first DC blocking capacitor and the fourth DC blocking capacitor, and the third reference node is connected with the signal output terminal.

The baseline drift reduction circuit includes: an impedance suppression circuit having a first terminal connected with the signal output terminal and having a second terminal that is grounded.

There is a fourth reference node between the first resistance circuit and the second resistance circuit and the baseline drift reduction circuit includes:

- a fifth DC blocking capacitor, where the first electrode plate of the fifth DC blocking capacitor is connected with the fourth reference node, and the second electrode plate of the second DC blocking capacitor is connected with the signal output terminal; and an impedance suppression circuit having a first terminal connected with the signal output terminal and having a second terminal that is grounded.

According to a second aspect, an embodiment of this application provides a laser detection module, including the AC coupling circuit in any one of the foregoing embodiments, a laser detector, a receiving and amplification circuit, a comparator, a time-to-digital converter and a threshold voltage generation circuit, where the laser detector, the receiving and amplification circuit, the AC coupling circuit, the comparator and the time-to-digital converter are connected sequentially, and the threshold voltage generation circuit is connected with the comparator.

According to a third aspect, an embodiment of this application provides LiDAR, including: a laser emission module, configured to emit a laser beam; the foregoing laser detection module, configured to receive a laser beam echo; and a controller connected with both the laser emission module and the laser detection module.

The impedance matching circuit has a signal input terminal configured to be accessed by the first AC signal, and the impedance matching circuit is configured to perform matching on the transmission impedance of the AC coupling circuit, to avoid mismatch between impedance and the transmission impedance of the AC coupling circuit and avoid signal reflection of the first AC signal in the AC coupling circuit, so that the AC coupling circuit can transmit the first AC signal via maximum power, thereby improving energy utilization benefits. The baseline drift reduction circuit is connected with the impedance matching circuit and has a signal output terminal for outputting the second AC signal, and the baseline drift reduction circuit is configured to reduce the baseline drift in the AC coupling circuit based on the premise that the impedance matching circuit performs matching on the transmission impedance of the AC coupling circuit. In this way, fluctuation of the first AC signal is avoided, and when the first AC signal is an echo signal output by a silicon photomultiplier, the baseline drift reduction circuit can avoid the fluctuation of the echo signal, to improve the ranging accuracy and reflectivity detection accuracy of the LiDAR.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application.

REFERENCE SIGNS

Figure 1:
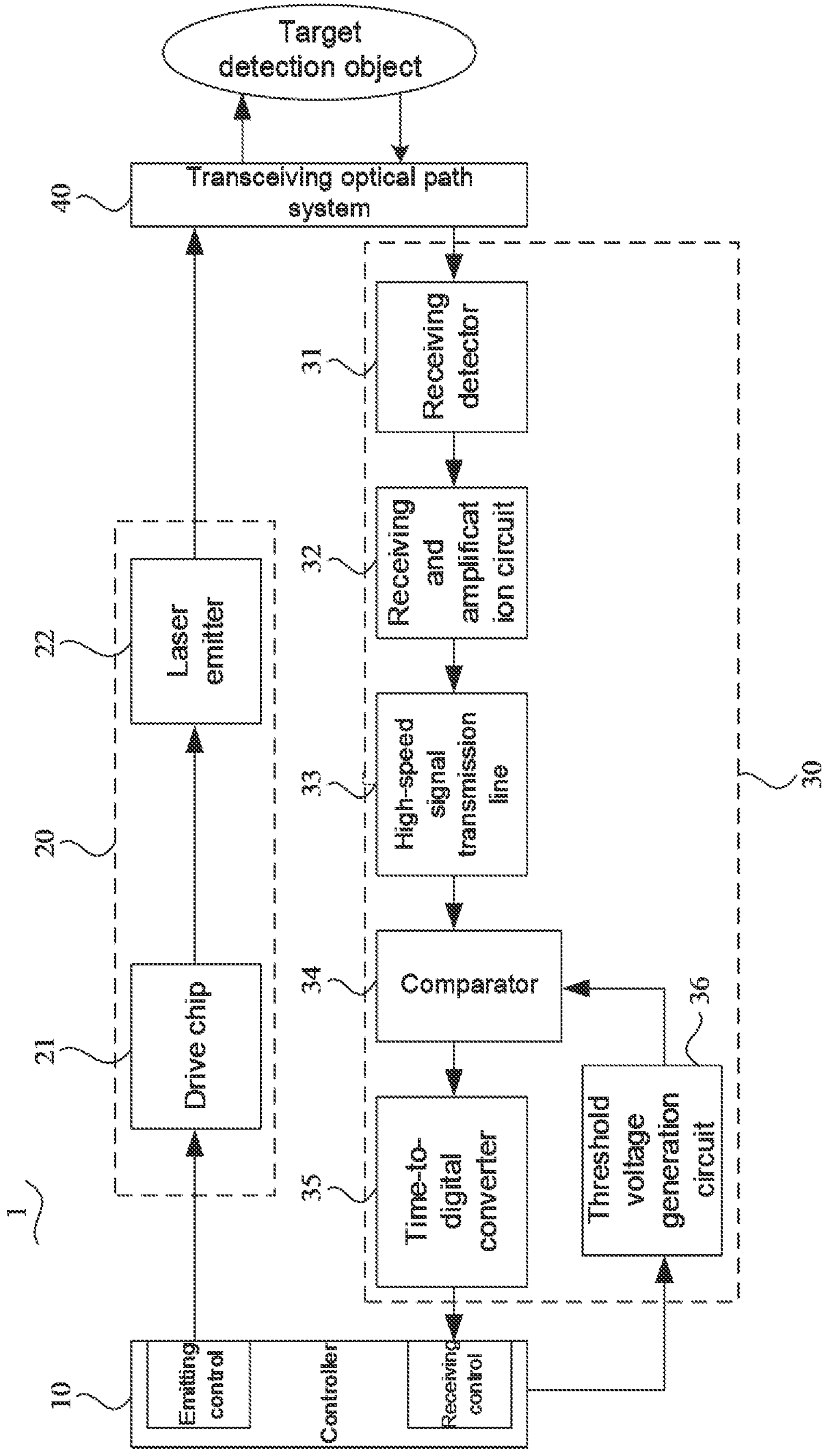
FIG. 1 is a schematic structural diagram of a framework of a LiDAR according to an embodiment.

R1'—first resistor; R2'—second resistor; and C'—DC blocking capacitor; and

1—LiDAR; 10—controller; 20—laser emission module; 21—drive chip; 22—laser emitter; 30—laser detection module; 31—receiving detector; 32—receiving and amplification circuit; 33—high-speed signal transmission line; 34—comparator; 35—time-to-digital converter; 36—threshold voltage generation circuit; 231—impedance matching circuit; 2311—first resistance circuit; R1—first matching resistor; 2312—second resistance circuit; R2—second matching resistor; 232—baseline drift reduction circuit; C1—first DC blocking capacitor; 2321—first cancellation circuit; C2—second DC blocking capacitor; R3—first voltage divider resistor; 2322—second cancellation circuit; C3—third DC blocking capacitor; C4—fourth DC blocking capacitor; C5—fifth DC blocking capacitor; R4—second voltage divider resistor; 2323—impedance suppression circuit; R5—suppression resistor; 30—time-to-digital converter; a1—first reference node; a2—second reference node; a3—third reference node; and a4—fourth reference node.

DETAILED DESCRIPTION

To make objectives, technical solutions and advantages of the present application clearer, embodiments of the present application are described in further detail below with reference to the drawings.

When the following description relates to the accompanying drawings, unless otherwise specified, the same numbers in different accompanying drawings represent the same or similar elements. The implementations are merely examples of apparatuses and methods consistent with those in some aspects of this application detailed in the appended embodiments.

The terms such as "first" and "second" are merely intended for purpose of description, and shall not be understood as an indication or implication of relative importance. "A plurality of" means two or more unless otherwise specified. Herein, "and/or" is an association relationship for describing associated objects and indicates that three relationships may exist. For example, A and/or B may mean the following three cases: only A exists, both A and B exist, and only B exists. The character "/" generally indicates an "or" relationship between the associated objects.

Unless otherwise defined, all technical and scientific terms used herein shall have the same meanings as those commonly understood by a person skilled in the art to which this application pertains. The terms used in this specification are only used to describe purpose of specific embodiments, but are not intended to limit this application. The term "and/or" used herein includes any and all combinations of one or more related listed items.

An embodiment of this application provides LiDAR 1, and the LiDAR 1 includes a controller 10, a laser emission module 20, a laser detection module 30 and a transceiving optical path system 40.

The laser emission module 20 is configured to emit a laser beam, and the laser emission module 20 may include a drive chip 21 connected with the controller 10 and a laser emitter 22 connected with the drive chip 21. Controlled by the controller 10, the drive chip 21 drives the laser emitter 22 to emit a laser beam, and the laser beam emitted by the laser emitter 22 is incident on a target detection object after being subjected to optical processing by the transceiving optical path system 40, and the target detection object can reflect the received laser beam. A laser beam reflected by the target detection object is received by the laser detection module 30 after being subjected to optical processing by the transceiving optical path system 40.

The laser detection module 30 includes a laser detector 31, a receiving and amplification circuit 32, a high-speed signal transmission line 33, a comparator 34, and a time-to-digital converter 35 that are connected sequentially. The laser detection module 30 includes a threshold voltage generation circuit 36 connected with both the controller 10 and the comparator 34. Exemplarily, the laser detector 31 may be a silicon photomultiplier. The laser detector 31 is configured to receive the echo laser beam reflected by the target detection object and to generate an echo signal. The receiving and amplification circuit 32 receives the echo signal and amplifies the echo signal. Exemplarily, the receiving amplifier can include a transimpedance amplifier to facilitate power consumption and heat dissipation designs for the transimpedance amplifier. The receiving and amplification circuit 32 transmits an amplified echo signal to the comparator 34 through the high-speed signal transmission line 33, and the comparator 34 converts an echo signal in a form of an analog signal into an echo signal in a form of a digital signal based on a threshold voltage provided by the threshold voltage generation circuit 36 and transmits the echo signal in the form of the digital signal to the time-to-digital converter 35. Based on the received echo signal, the time-to-digital converter 35 obtains an echo time point at which the laser detection module 30 receives the echo laser. In addition, the time-to-digital converter 35 also obtains an emission time point at which the laser emission module 20 emits a laser beam, and the controller 10 calculates a distance between the LiDAR and the target detection object according to a time-of-flight method by using the emission time point and the echo time point.

Figure 2:
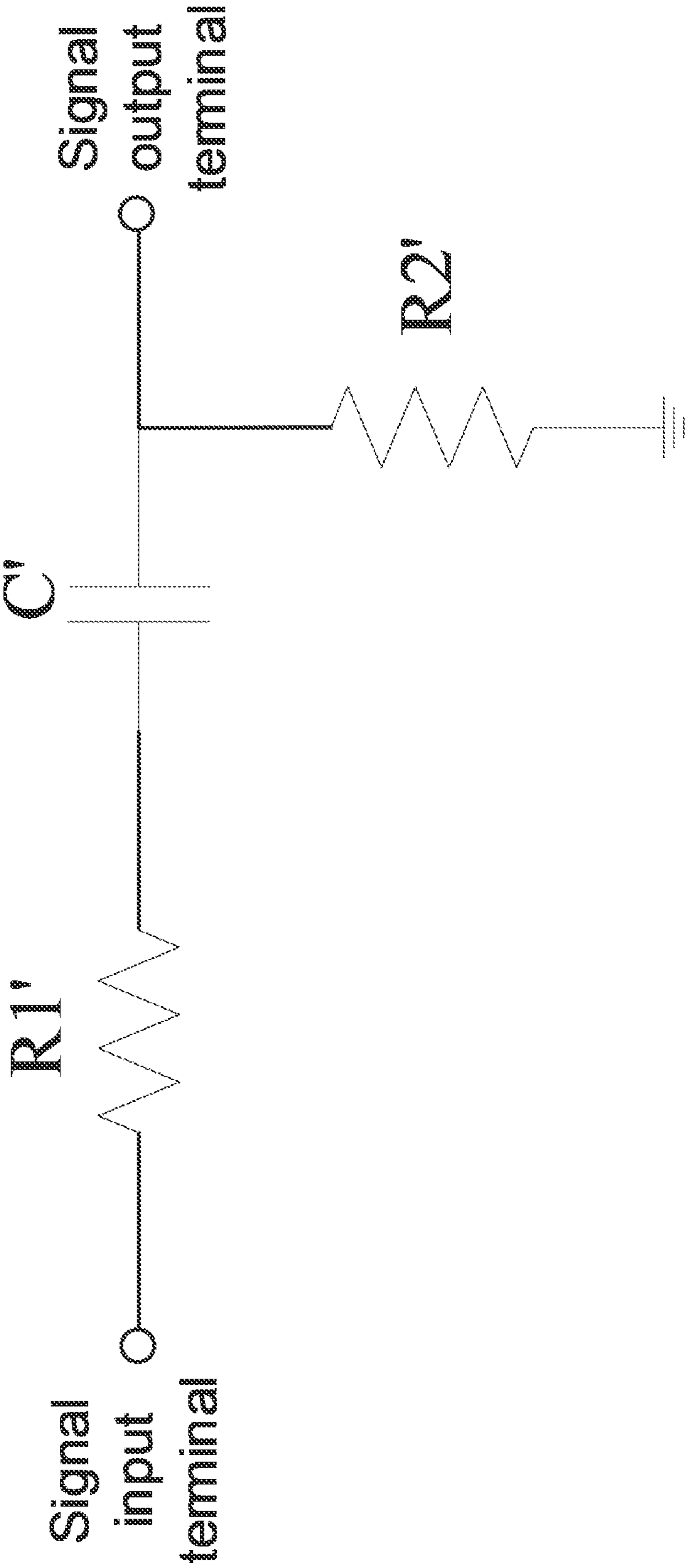
FIG. 2 is a schematic circuit diagram of an AC coupling circuit.

Common circuit forms of high-speed signal transmission lines 33 include an AC coupling transmission circuit. Referring to FIG. 2, FIG. 2 shows a circuit form of an AC coupling circuit in an AC coupling transmission circuit in an example. The AC coupling circuit in the AC coupling transmission circuit includes a first resistor R1', a second resistor R2' and a DC blocking capacitor C' connected in series. One terminal of the first resistor R1' is used as a signal input terminal, and the signal output terminal is extended from space between the second resistor R2' and the DC blocking capacitor C', where the first resistor R1' and the second resistor R2' are configured to perform matching on transmission impedance, and the DC blocking capacitor C' is configured to block a DC component in optical noise and a DC drift characteristic of an operational amplifier.

In an actual working process of the LiDAR 1, an environment in which the LiDAR 1 is located is extremely complex. An object at a different distance from the LiDAR 1 and an object with a different reflectivity exist in the environment, corresponding to target detection objects at different distances and/or with different reflectivities, echo signals generated by the laser detector 31 are different. For example, a first target detection object with high brightness and a second target detection object with low brightness exist in the environment, corresponding to a laser beam echo reflected back by the first target detection object with high brightness, a pulse width of a first echo signal generated by the laser detector 31 is greater; and corresponding to a laser beam echo reflected back from the second target detection object with low brightness, a pulse width of a second echo signal generated by the laser detector 31 is smaller. An equivalent DC component in the first echo signal and an equivalent DC component in the second echo signal are also different, and after the first echo signal and the second echo signal are transmitted to the DC blocking capacitor C', different equivalent DC components cause charge and discharge processes across two terminals of the DC blocking capacitor C', thereby causing a change in a voltage across the two terminals of the DC blocking capacitor C', that is, baseline fluctuation of the AC coupling circuit, namely, the baseline drift.

The echo signal can be understood as a result of superimposition of an electrical pulse signal triggered by an optical pulse signal onto the baseline signal, and after the baseline drift, a baseline signal changes, and an echo signal obtained after the superimposition of the baseline signal onto the electrical pulse signal is distorted. However, in the comparator 34, the echo signal is still compared with the threshold voltage originally provided by the threshold voltage generation circuit to convert the echo signal into the echo signal in the form of the digital signal, which causes an error in the echo signal output from the comparator 34 to the time-to-digital converter 35, thereby eventually causing a decrease in ranging accuracy and reflectivity detection accuracy of the LiDAR 1.

Figure 3:
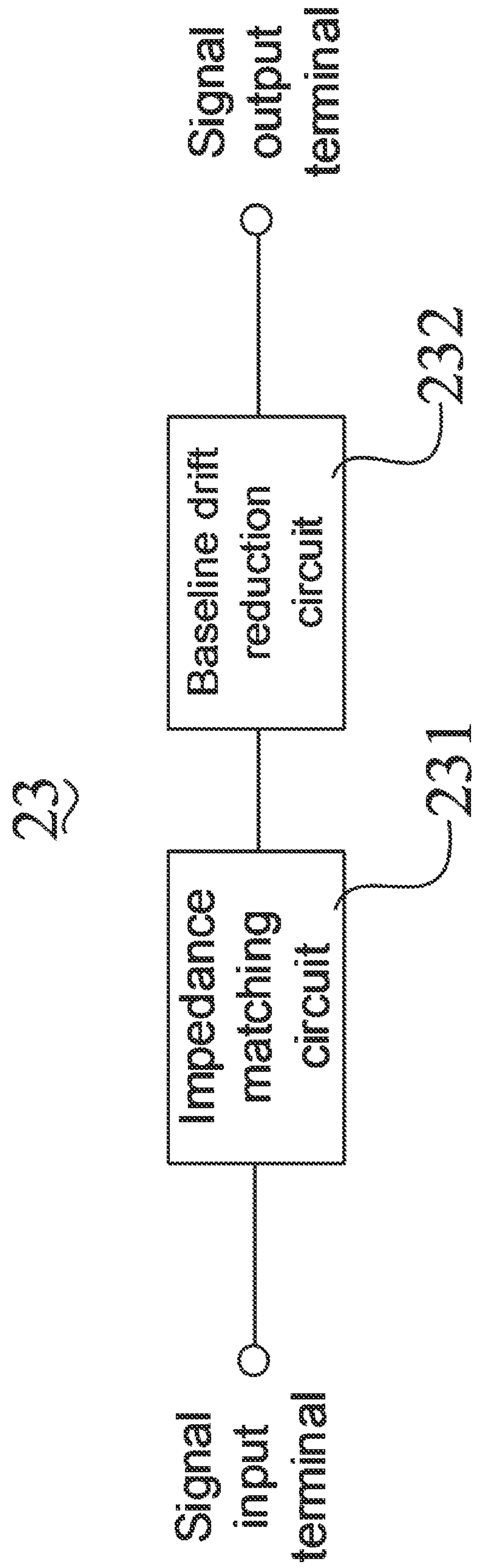
FIG. 3 is a schematic structural diagram of a framework of an AC coupling circuit according to an embodiment.

Referring to FIG. 1 and FIG. 3, to reduce or even eliminate the problem of the baseline drift of the AC coupling transmission circuit, an embodiment of this application provides an AC coupling circuit 23, and the AC coupling circuit 23 is configured to be accessed by the first AC signal and block the DC component in the first AC signal to form and output a second AC signal, where the first AC signal may be an echo signal generated by the laser detector 31. The AC coupling circuit 23 includes an impedance matching circuit 231 and a baseline drift reduction circuit 232.

The impedance matching circuit 231 has a signal input terminal configured to be accessed by the first AC signal, and the impedance matching circuit 231 is configured to perform matching on the transmission impedance of the AC coupling circuit 23, to avoid mismatch between impedance and the transmission impedance of the AC coupling circuit 23 and further reduce signal reflectivity during transmission of the first AC signal in the AC coupling circuit 23, so that the AC coupling circuit 23 can transmit the first AC signal with greater power, thereby improving energy utilization benefits. When the receiving and amplification circuit 32 includes a transimpedance amplifier, a signal input terminal of the impedance matching circuit 231 can be connected with a non-inverting input terminal, an inverting input terminal or an output terminal of the transimpedance amplifier. That is, the AC coupling circuit 23 in this embodiment not only can be used as the high-speed signal transmission line 33 shown in FIG. 1, but also can be applied to another scenario that requires high-speed signal transmission.

The baseline drift reduction circuit 232 is connected with the impedance matching circuit 231 and has a signal output terminal for outputting the second AC signal, and the baseline drift reduction circuit 232 is configured to reduce the baseline drift in the AC coupling circuit 23 via symmetry of the baseline drifts in the AC coupling circuit 23 based on the premise that the impedance matching circuit 231 performs matching on the transmission impedance of the AC coupling circuit 23. In this way, fluctuation of the first AC signal is avoided, and when the first AC signal is the echo signal that is output by the laser detector 31 and that is amplified by the receiving and amplification circuit 32, the baseline drift reduction circuit 232 can reduce a fluctuation degree and a distortion degree of the echo signal output to the comparator 34, to improve the ranging accuracy and reflectivity detection accuracy of the LiDAR 1.

Figure 4:
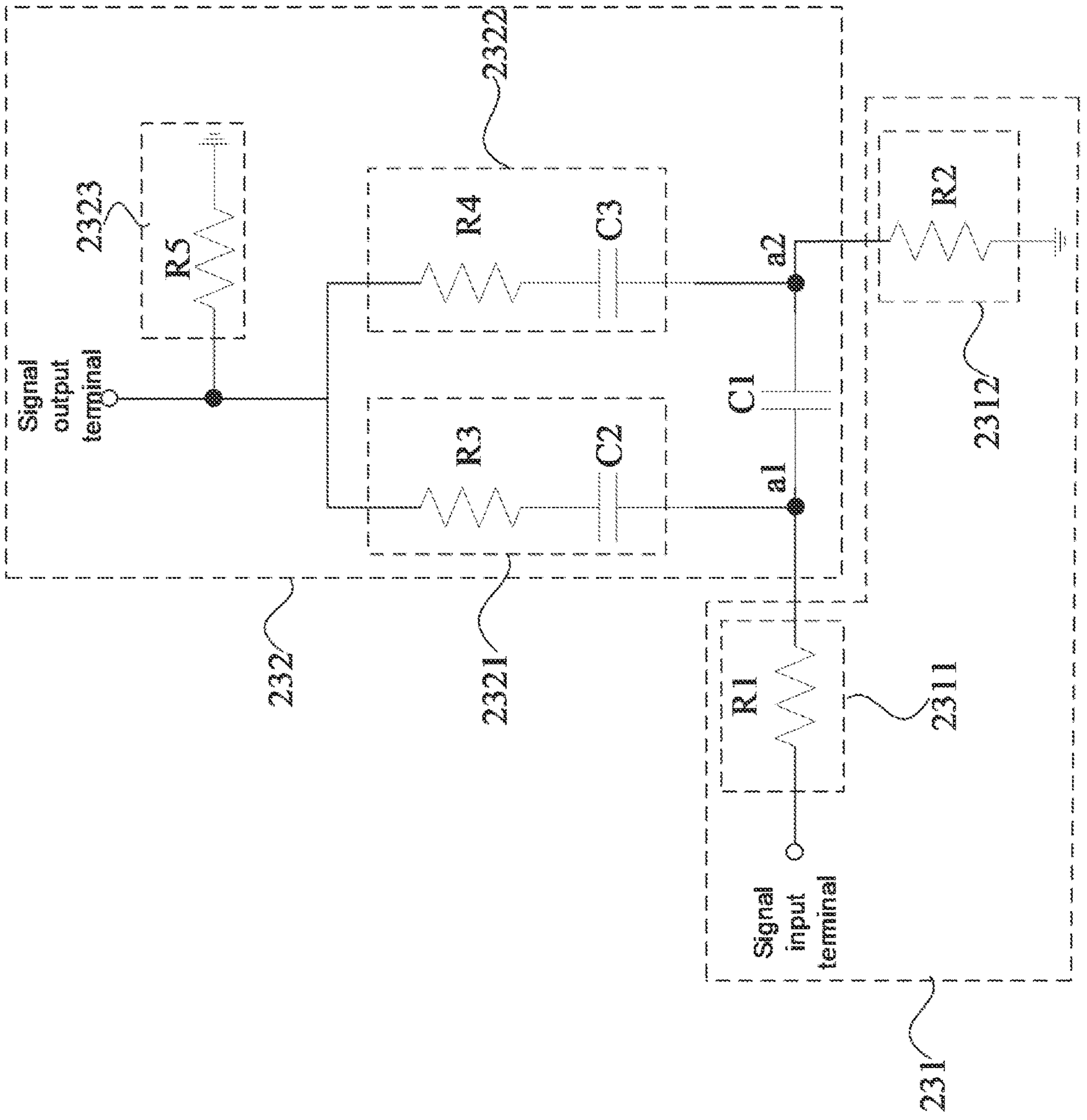
FIG. 4 is a schematic circuit diagram of an AC coupling circuit according to an embodiment.

Referring to FIG. 4, in some embodiments, the impedance matching circuit 231 includes a first resistance circuit 2311 and a second resistance circuit 2312 connected in series, a first terminal of the first resistance circuit 2311 is used as a signal input terminal and configured to be accessed by the first AC signal, the second terminal of the first resistance circuit 2311 is connected with the first terminal of the second resistance circuit 2312, and the second terminal of the second resistance circuit 2312 is grounded. The first resistance circuit 2311 and the second resistance circuit 2312 are both configured to perform matching on the transmission impedance of the AC coupling circuit 23. Exemplarily, resistance of the first resistance circuit 2311 is equal to or approximately equal to the transmission impedance of the AC coupling circuit 23, and resistance of the second resistance circuit 2312 is also equal to or approximately equal to the transmission impedance of the AC coupling circuit 23, thereby implementing impedance matching. The baseline drift reduction circuit 232 is connected with a connection wire between the first resistance circuit 2311 and the second resistance circuit 2312, so that the generated baseline drifts of the first AC signal in the AC coupling circuit 23 are reduced by using symmetry of the baseline drifts in the AC coupling circuit 23 after the first resistance circuit 2311 and the second resistance circuit 2312 transmit the first AC signal.

In some embodiments, the first resistance circuit 2311 includes a first matching resistor R1, and resistance of the first matching resistor R1 is equal to or approximately equal to the transmission impedance of the AC coupling circuit 23, and the second resistance circuit 2312 includes a second matching resistor R2, and resistance of the second matching resistor R2 is equal to or approximately equal to the transmission impedance of the AC coupling circuit 23. In some embodiments, the first resistance circuit 2311 may include multiple resistors or a combination of the resistor and another electronic device, as long as the impedance of the first resistance circuit 2311 is equal to or approximately equal to the transmission impedance. Likewise, the second resistance circuit 2312 may include multiple resistors or a combination of the resistor and another electronic device, as long as the impedance of the second resistance circuit 2312 is equal to or approximately equal to the transmission impedance.

In some embodiments, the baseline drift reduction circuit 232 includes a first DC blocking capacitor C1, the second terminal of the first resistance circuit 2311 is connected with the first terminal of the second resistance circuit 2312 through the first DC blocking capacitor C1, and the first DC blocking capacitor C1 is configured to block the DC component in the first AC signal to form a second AC signal. The DC component in the first AC signal can be blocked by using characteristics of restricting the DC and conducting the AC by the first DC blocking capacitor C1, and when the first AC signal is an echo signal amplified by the receiving and amplification circuit 32, the first DC blocking capacitor C1 can also block a DC drift characteristic of an amplifier (including but not limited to the transimpedance amplifier) in the receiving and amplification circuit 32.

Referring to FIG. 4, in some embodiments, a second terminal of the first resistance circuit 2311 and a first electrode plate of the first DC blocking capacitor C1 are connected with the first reference node a1, and a first terminal of the second resistance circuit 2312 and a second electrode plate of the first DC blocking capacitor C1 are connected with the second reference node a2. When the baseline drift occurs, because the first resistance circuit 2311 and the second resistance circuit 2312 are respectively arranged at two terminals of the first DC blocking capacitor C1, baseline drifts before and behind the first DC blocking capacitor C1 are symmetrical, baseline drift directions of the first reference node a1 and the second reference node a2 are symmetrical. When a voltage at the first reference node a1 drifts upwards to increase a certain voltage value, a voltage at the second reference node a2 drifts downward to decrease this certain voltage value, and the generated baseline drift of the first AC signal on the AC coupling circuit 23 can be reduced via symmetry of the baseline drifts before and behind the first DC blocking capacitor C1.

The baseline drift reduction circuit 232 further includes a first cancellation circuit 2321 and a second cancellation circuit 2322, a first terminal of the first cancellation circuit 2321 is connected with the first reference node a1, and a second terminal of the first cancellation circuit 2321 is connected with the signal output terminal. The first terminal of the second cancellation circuit 2322 is connected with the second reference node a2, and the second terminal of the second cancellation circuit 2322 is connected with the signal output terminal, that is, the first terminal of the first cancellation circuit 2321 and the second terminal of the second cancellation circuit 2322 are respectively connected with the first reference node a1 and the second reference node a2, and the second terminal of the first cancellation circuit 2321 and the second terminal of the second cancellation circuit 2322 are jointly connected with the signal output terminal. In this way, the baseline drift at the first reference node a1 and the baseline drift at the second reference node a2 meet at the signal output terminal and cancel each other out at least partially, and the second AC signal output by the signal output terminal is weakened by the baseline drift, thereby reducing impact of the baseline drift on the ranging accuracy and reflectivity detection accuracy of the LiDAR 1 and improving accuracy of detecting the distance and reflectivity by the LiDAR 1.

The first cancellation circuit 2321 and the second cancellation circuit 2322 can be in various specific circuit forms, as long as baseline drifts at the first reference node a1 and the second reference node a2 before and behind the first DC blocking capacitor C1 can cancel each other out. In some specific embodiments, the first cancellation circuit 2321 includes a second DC blocking capacitor C2 and a first voltage divider resistor R3 connected in series, one of the second DC blocking capacitor C2 and the first voltage divider resistor R3 is connected with the first reference node a1, and the other is connected with the signal output terminal. Specifically, it is possible that the second DC blocking capacitor C2 is connected with the first reference node a1 and the first voltage divider resistor R3 is connected with the signal output terminal, or it is possible that the second DC blocking capacitor C2 is connected with the signal output terminal and the first voltage divider resistor R3 is connected with the first reference node a1. The second cancellation circuit 2322 includes a third DC blocking capacitor C3 and a second voltage divider resistor R4 connected in series, one of the third DC blocking capacitor C3 and the second voltage divider resistor R4 is connected with the second reference node a2, and the other is connected with the signal output terminal. Specifically, it is possible that the third DC blocking capacitor C3 is connected with the second reference node a2 and the second voltage divider resistor R4 is connected with the signal output terminal, or it is possible that the third DC blocking capacitor C3 is connected with the signal output terminal and the second voltage divider resistor R4 is connected with the second reference node a2.

In an embodiment, the first voltage divider resistor R3 and the second voltage divider resistor R4 are arranged. The signal output terminal is located between the first voltage divider resistor R3 and the second voltage divider resistor R4. The signal output terminal can be regarded as a voltage divider node of the first voltage divider resistor R3 and the second voltage divider resistor R4, and a weighted addition method is implemented for a voltage at the first reference node a1 and a voltage at the second reference node a2 at the voltage divider node. In addition, the second DC blocking capacitor C2 can block a DC component in an echo signal transmitted to the first cancellation circuit 2321. The third DC blocking capacitor C3 can block a DC component in the echo signal transmitted to the second cancellation circuit 2322, and therefore, the echo signals transmitted to the signal output terminal by the first cancellation circuit 2321 and the second cancellation circuit 2322 only include AC components. That is, the weighted addiction method is implemented for the AC signal at the signal output terminal, and when the first voltage divider resistor R3 and the second voltage divider resistor R4 have close or equal resistance, a baseline drift at the first reference node a1 can cancel out a baseline drift at the second reference node a2, so that the baseline drift of the AC coupling circuit 23 is reduced.

Still referring to FIG. 4, to further realize cancellation of the baseline drift at the first reference node a1 and the baseline drift at the second reference node a2, the baseline drift reduction circuit 232 may also include an impedance suppression circuit 2323. The first terminal of the impedance suppression circuit 2323 is connected with the signal output terminal, and the second terminal is grounded. In addition, adjustable resistors can be set as the first voltage divider resistor R3 and the second voltage divider resistor R4. After the first AC signal is input into the signal input terminal, the first AC signal first flows from the first reference node a1 to the first cancellation circuit 2321, and after there is a current $I_{2321}$ on the first cancellation circuit 2321, the current $I_{2321}$ is shunted to an impedance suppression circuit 2323 and a second cancellation circuit 2322; and there is a current $I_{2323}$ on the impedance suppression circuit 2323, there is a current $I_{2322}$ on the second cancellation circuit 2322, and $I_{2321}=I_{2322}+I_{2323}$, where the current $I_{2321}$ is greater than the current $I_{2322}$. A voltage across two terminals of the first voltage divider resistor R3 satisfies that $U_{R3}=I_{2321}\lambda R3$, and a voltage across two terminals of the second voltage divider resistor R4 satisfies that $U_{R4}=I_{2322}\times R4$. When R3 is equal to R4, because the current $I_{2321}$ is greater than the current $I_{2322}$, $U_{R3}$ is greater than $U_{R4}$. Because voltage amplitude of the baseline drift carried by $U_{R3}$ is also greater than voltage amplitude of the baseline drift carried by $U_{R4}$, at the signal output terminal, the voltage amplitude of the baseline drift carried by $U_{R3}$ cannot be completely canceled out by the voltage amplitude of the baseline drift carried by $U_{R4}$, and at this moment, resistance of R3 is decreased or the resistance of R4 is increased, so that $U_{R3}$ is finally equal to $U_{R4}$ and the voltage amplitude of the baseline drift carried by $U_{R3}$ is equal to the voltage amplitude of the baseline drift carried by $U_{R4}$, thereby implementing an optimal cancellation effect on the voltage amplitude of the baseline drift carried by $U_{R3}$ and the voltage amplitude of the baseline drift carried by $U_{R4}$. That is, an optimal cancellation effect on baseline drifts at the first reference node a1 and the second reference node a2 is implemented at the signal output terminal, which further improves the ranging accuracy and the reflectivity detection accuracy of the LiDAR 1. In an example, the impedance suppression circuit 2323 may include a suppression resistor R5. A first terminal of the suppression resistor R5 is connected with the signal output terminal, and a second terminal is grounded.

Figure 5:
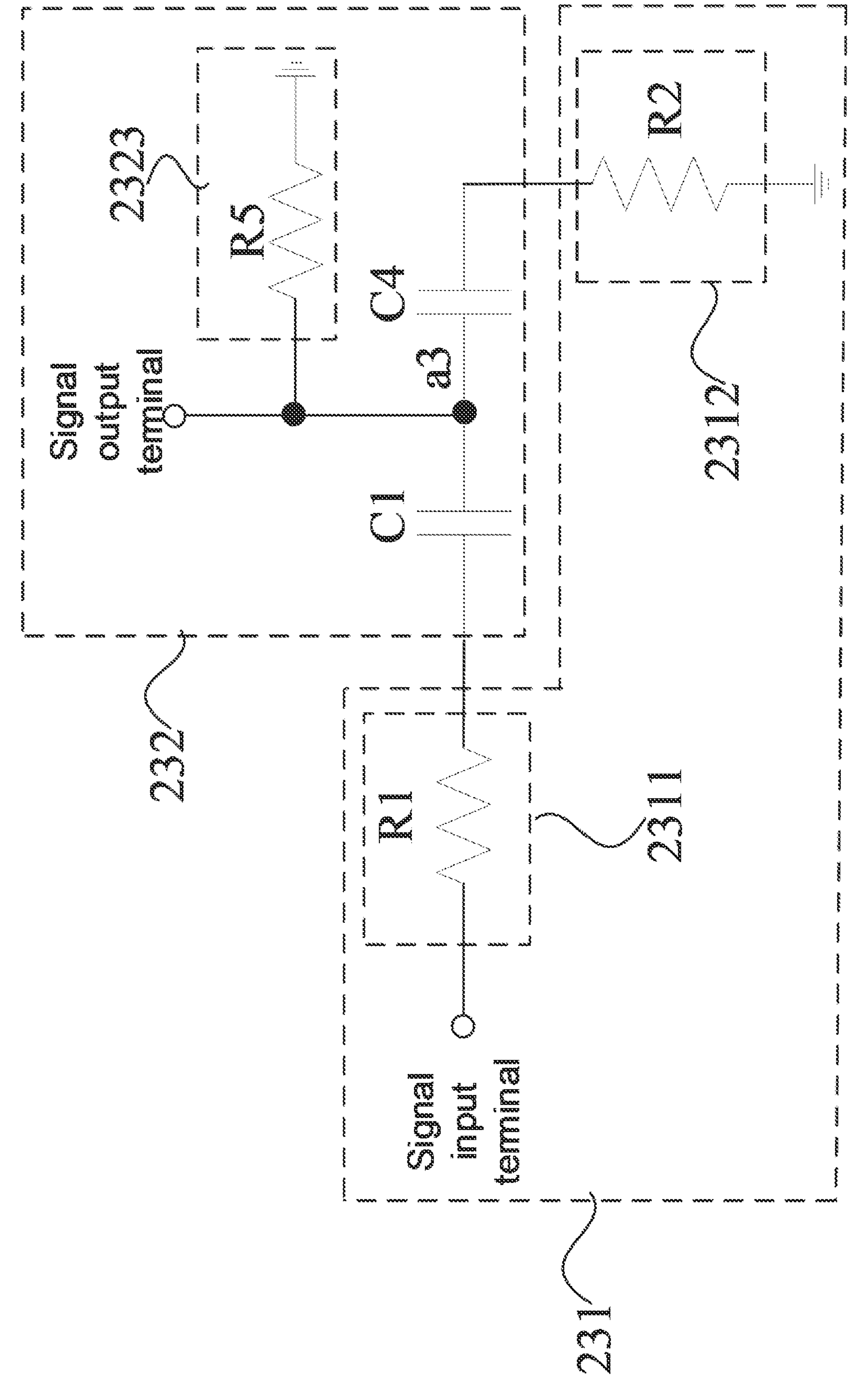
FIG. 5 is a schematic circuit diagram of another AC coupling circuit according to an embodiment.

Referring to FIG. 5, in some embodiments, the baseline drift reduction circuit 232 further includes a fourth DC blocking capacitor C4, and the second terminal of the first resistance circuit 2311 is connected with the first terminal of the second resistance circuit 2312 through the first DC blocking capacitor C1 and the fourth DC blocking capacitor C4 in sequence. There is a third reference node a3 between the first DC blocking capacitor C1 and the fourth DC blocking capacitor C4, and the third reference node a3 is connected with the signal output terminal. The baseline drifts before and behind the first DC blocking capacitor C1 are symmetrical, and therefore, baseline drifts before and behind the fourth DC blocking capacitor C4 are also symmetrical. For the first DC blocking capacitor C1, the third reference node a3 is located at a rear terminal of the first DC blocking capacitor C1. For the fourth DC blocking capacitor C4, the third reference node a3 is located at the front terminal of the fourth DC blocking capacitor C4, and the third reference node a3 is a symmetric point of the first DC blocking capacitor C1 and the fourth DC blocking capacitor C4, so that the baseline drifts cancel each other out at the third reference node a3 when the baseline drifts occur before and behind the first DC blocking capacitor C1 and the fourth DC blocking capacitor C4.

Referring to FIG. 5, the baseline drift reduction circuit 232 further includes an impedance suppression circuit 2323, the first terminal of the impedance suppression circuit 2323 is connected with the signal output terminal and the second terminal is grounded. Due to a broadband transmission requirement of the echo signal, resistance of the first resistance circuit 2311 and the second resistance circuit 2312 cannot be set as an excessively large value, and therefore, the baseline drift cannot be effectively suppressed. In an embodiment, the signal output terminal is further connected with an impedance suppression circuit 2323, and impedance of the impedance suppression circuit 2323 is set as a value large enough as required, so that establishment of a baseline drift process can be inhibited. Therefore, the baseline drift can be effectively suppressed, and the impact of the baseline drift on a circuit at a subsequent phase such as the time-to-digital converter 30 can be reduced, thereby improving the ranging accuracy and reflectivity detection accuracy of the LiDAR 1. Specifically, the impedance suppression circuit 2323 may include a suppression resistor R5. A first terminal of the suppression resistor R5 is connected with the signal output terminal, and a second terminal is grounded.

Figure 6:
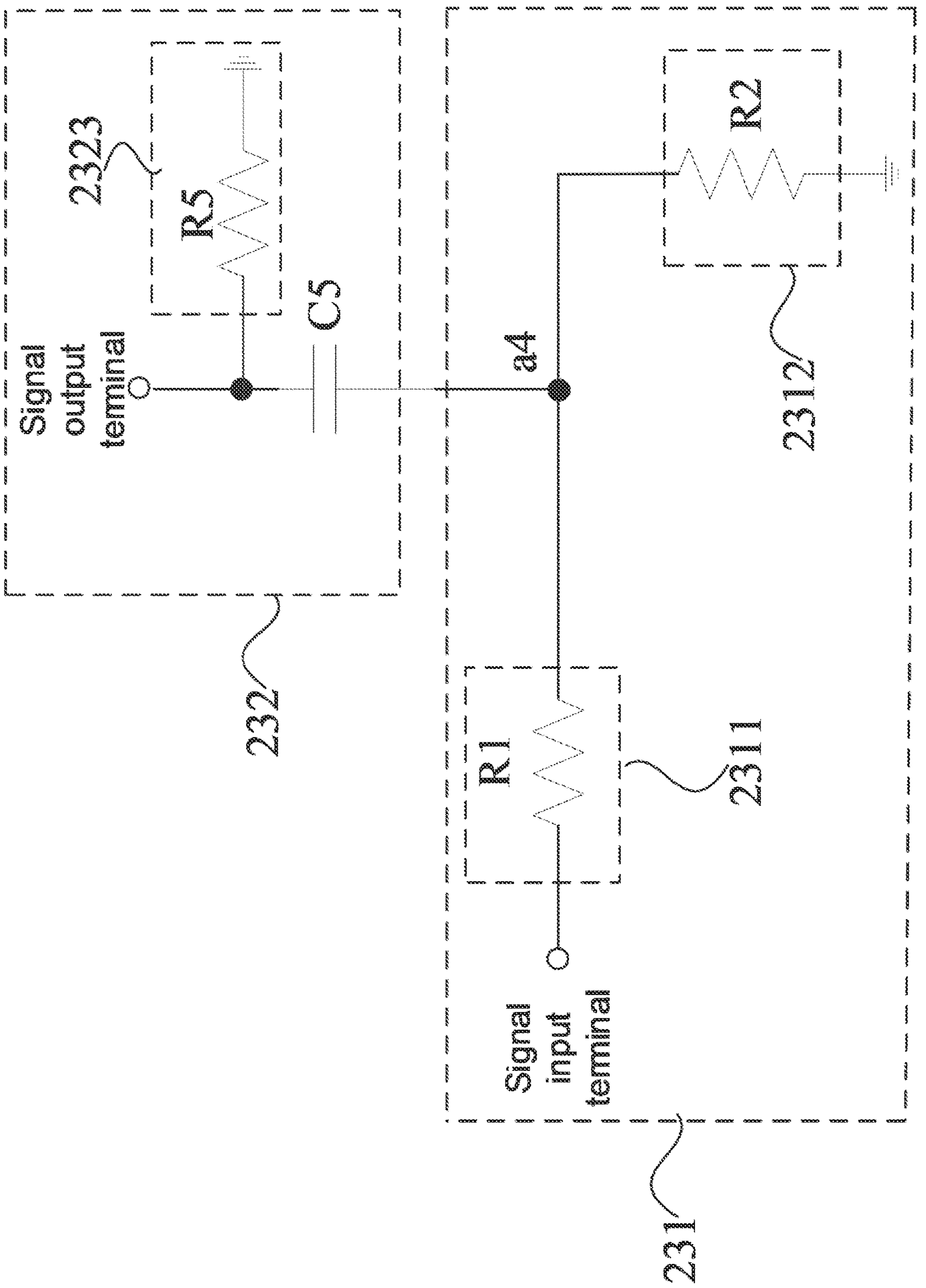
FIG. 6 is a schematic circuit diagram of still another AC coupling circuit according to an embodiment.

Referring to FIG. 6, in some embodiments, there is a fourth reference node a4 between the first resistance circuit 2311 and the second resistance circuit 2312, and the baseline drift reduction circuit 232 includes a fifth DC blocking capacitor C5 and an impedance suppression circuit 2323. The first electrode plate of the fifth DC blocking capacitor C5 is connected with the fourth reference node a4, the second electrode plate of the second DC blocking capacitor C2 is connected with the signal output terminal. The first terminal of the impedance suppression circuit 2323 is connected with the signal output terminal, and the second terminal is grounded. The DC component in the echo signal can be blocked by using the fifth DC blocking capacitor C5. In addition, due to a broadband transmission requirement of the echo signal, resistance of the first resistance circuit 2311 and the second resistance circuit 2312 cannot be set as an excessively large value, and therefore, the baseline drift cannot be effectively suppressed. In an embodiment, the signal output terminal is further connected with an impedance suppression circuit 2323, and impedance of the impedance suppression circuit 2323 is set as a value large enough as required, so that establishment of a baseline drift process can be inhibited. Therefore, the baseline drift can be effectively suppressed, and the impact of the baseline drift on a circuit at a subsequent phase such as the time-to-digital converter 30 can be reduced, thereby improving the ranging accuracy and reflectivity detection accuracy of the LiDAR 1. The impedance suppression circuit 2323 may include a suppression resistor R5, a first terminal of the suppression resistor R5 is connected with the signal output terminal, and a second terminal is grounded.

What is claimed is:

1. An AC coupling circuit, wherein the AC coupling circuit is configured to be accessed by a first AC signal and block a DC component in the first AC signal to form and output a second AC signal, and the AC coupling circuit comprises:

an impedance matching circuit having a signal input terminal for being accessed by the first AC signal, wherein the impedance matching circuit is configured to perform matching on transmission impedance of the AC coupling circuit; and a baseline drift reduction circuit, connected with the impedance matching circuit and having a signal output terminal for outputting the second AC signal, wherein the baseline drift reduction circuit uses symmetry of a baseline drift in the AC coupling circuit to reduce the baseline drift in the AC coupling circuit.

2. The AC coupling circuit according to claim 1, wherein:

the impedance matching circuit comprises a first resistance circuit and a second resistance circuit connected in series, a first terminal of the first resistance circuit is used as the signal input terminal, a second terminal of the first resistance circuit is connected with a first terminal of the second resistance circuit, a second terminal of the second resistance circuit is grounded, the first resistance circuit and the second resistance circuit are configured to perform matching on the transmission impedance of the AC coupling circuit, and the baseline drift reduction circuit is connected with a connection wire between the first resistance circuit and the second resistance circuit.

3. The AC coupling circuit according to claim 2, wherein the baseline drift reduction circuit comprises:

a first DC blocking capacitor, wherein the second terminal of the first resistance circuit is connected with the first terminal of the second resistance circuit through the first DC blocking capacitor, and the first DC blocking capacitor is configured to block the DC component in the first AC signal to form the second AC signal.

4. The AC coupling circuit according to claim 3, wherein the second terminal of the first resistance circuit and a first electrode plate of the first DC blocking capacitor are connected with a first reference node, the first terminal of the second resistance circuit and a second electrode plate of the first DC blocking capacitor are connected with a second reference node, and the baseline drift reduction circuit further comprises:

a first cancellation circuit, wherein a first terminal of the first cancellation circuit is connected with the first reference node, and a second terminal of the first cancellation circuit is connected with the signal output terminal; and a second cancellation circuit, wherein a first terminal of the second cancellation circuit is connected with the second reference node, and a second terminal of the second cancellation circuit is connected with the signal output terminal.

5. The AC coupling circuit according to claim 4, wherein:

the first cancellation circuit comprises a second DC blocking capacitor and a first voltage divider resistor connected in series, one of the second DC blocking capacitor and the first voltage divider resistor is connected with the first reference node, and the other is connected with the signal output terminal; and the second cancellation circuit comprises a third DC blocking capacitor and a second voltage divider resistor connected in series, one of the third DC blocking capacitor and the second voltage divider resistor is connected with the second reference node, and the other is connected with the signal output terminal.

6. The AC coupling circuit according to claim 3, wherein the baseline drift reduction circuit further comprises:

a fourth DC blocking capacitor, wherein a second terminal of the first resistance circuit is connected with the first terminal of the second resistance circuit through the first DC blocking capacitor and the fourth DC blocking capacitor in sequence, a third reference node is provided between the first DC blocking capacitor and the fourth DC blocking capacitor, and the third reference node is connected with the signal output terminal.

7. The AC coupling circuit according to claim 4, wherein the baseline drift reduction circuit comprises:

an impedance suppression circuit having a first terminal connected with the signal output terminal and having a second terminal that is grounded.

8. The AC coupling circuit according to claim 2, wherein there is a fourth reference node between the first resistance circuit and the second resistance circuit and the baseline drift reduction circuit comprises:

a fifth DC blocking capacitor, wherein a first electrode plate of the fifth DC blocking capacitor is connected with the fourth reference node, and a second electrode plate of the second DC blocking capacitor is connected with the signal output terminal; and an impedance suppression circuit having a first terminal connected with the signal output terminal and having a second terminal that is grounded.

9. A laser detection module, comprising:

an AC coupling circuit, a laser detector, a receiving and amplification circuit, a comparator, a time-to-digital converter, and a threshold voltage generation circuit, wherein the laser detector, the receiving and amplification circuit, the AC coupling circuit, the comparator, and the time-to-digital converter are connected sequentially, and the threshold voltage generation circuit is connected with the comparator, wherein the AC coupling circuit is configured to be accessed by a first AC signal and block a DC component in the first AC signal to form and output a second AC signal, and wherein the AC coupling circuit comprises:

an impedance matching circuit having a signal input terminal for being accessed by the first AC signal, wherein the impedance matching circuit is configured to perform matching on transmission impedance of the AC coupling circuit; and a baseline drift reduction circuit, connected with the impedance matching circuit and having a signal output terminal for outputting the second AC signal, wherein the baseline drift reduction circuit uses symmetry of a baseline drift in the AC coupling circuit to reduce the baseline drift in the AC coupling circuit.

10. A LIDAR, comprising:

a laser emission module, configured to emit a laser beam;

a laser detection module configured to receive a laser beam echo; and a controller connected with both the laser emission module and the laser detection module, wherein the laser detection module comprises an AC coupling circuit, a laser detector, a receiving and amplification circuit, a comparator, a time-to-digital converter and a threshold voltage generation circuit, wherein the laser detector, the receiving and amplification circuit, the AC coupling circuit, the comparator and the time-to-digital converter are connected sequentially, and the threshold voltage generation circuit is connected with the comparator, wherein the AC coupling circuit is configured to be accessed by a first AC signal and block a DC component in the first AC signal to form and output a second AC signal, and wherein the AC coupling circuit comprises:

an impedance matching circuit having a signal input terminal for being accessed by the first AC signal, wherein the impedance matching circuit is configured to perform matching on transmission impedance of the AC coupling circuit; and a baseline drift reduction circuit, connected with the impedance matching circuit and having a signal output terminal for outputting the second AC signal, wherein the baseline drift reduction circuit uses symmetry of a baseline drift in the AC coupling circuit to reduce the baseline drift in the AC coupling circuit.

* * * * *